United States Patent
Bouillon et al.

(10) Patent No.: US 11,959,440 B2
(45) Date of Patent: Apr. 16, 2024

(54) ACOUSTIC ATTENUATION STRUCTURE MADE OF COMPOSITE MATERIAL AND METHOD FOR MANUFACTURING SAME

(71) Applicant: SAFRAN CERAMICS, Le Haillan (FR)

(72) Inventors: Eric Bouillon, Moissy-Cramayel (FR); Eric Conete, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/631,281

(22) PCT Filed: Aug. 12, 2020

(86) PCT No.: PCT/FR2020/051462
§ 371 (c)(1),
(2) Date: Jan. 28, 2022

(87) PCT Pub. No.: WO2021/032920
PCT Pub. Date: Feb. 25, 2021

(65) Prior Publication Data
US 2022/0252022 A1  Aug. 11, 2022

(30) Foreign Application Priority Data

Aug. 22, 2019  (FR) ..................... 1909337

(51) Int. Cl.
*F02K 1/82* (2006.01)
*F02C 7/24* (2006.01)

(52) U.S. Cl.
CPC ............... *F02K 1/827* (2013.01); *F02C 7/24* (2013.01); *F05D 2220/323* (2013.01);
(Continued)

(58) Field of Classification Search
CPC ... F02K 1/827; F02K 1/70; F02K 1/72; F05D 2240/128; F05D 2250/191; F05D 2260/963; F05D 2300/603; F02C 7/24
See application file for complete search history.

(56) References Cited

U.S. PATENT DOCUMENTS 3,481,427 A * 12/1969 Dobbs ................. F02K 1/827
428/116
3,966,522 A * 6/1976 Hatch ................. B29C 70/24
428/116
(Continued)

FOREIGN PATENT DOCUMENTS

FR  3 039 148 A1  1/2017
FR  3070308 A1 *  3/2019 ........... B29C 70/028

OTHER PUBLICATIONS

International Search Report as issued in International Patent Application No. PCT/FR2020/051462, dated Nov. 12, 2020.
(Continued)

*Primary Examiner* — Andrew H Nguyen
(74) *Attorney, Agent, or Firm* — Pillsbury Winthrop Shaw Pittman LLP

(57) ABSTRACT

An annular or semi-annular acoustic attenuation structure includes an inner skin and an outer skin, defining between them an annular or semi-annular volume, and a plurality of partitions extending in the space in a radial direction perpendicular to the inner and outer skins and in a circumferential direction. The inner and outer skins and the partitions are made of composite material including a fibrous reinforcement densified by a matrix. The fibrous reinforcement of each partition includes yarns or fibers extending into the fibrous reinforcement of at least one of the inner or outer skins.

12 Claims, 5 Drawing Sheets

(52) U.S. Cl.
CPC .... *F05D 2230/21* (2013.01); *F05D 2240/128* (2013.01); *F05D 2250/191* (2013.01); *F05D 2260/963* (2013.01); *F05D 2300/603* (2013.01)

(56) References Cited

U.S. PATENT DOCUMENTS

| | | | | |
|---|---|---|---|---|
| 5,601,674 | A | 2/1997 | Szweda et al. | |
| 7,540,354 | B2* | 6/2009 | Morin | F02K 1/827 428/116 |
| 7,784,283 | B2* | 8/2010 | Yu | F02K 1/04 60/770 |
| 9,631,519 | B2 | 4/2017 | Fouquet et al. | |
| 11,433,990 | B2* | 9/2022 | Sanz Martinez | F02C 7/045 |
| 2016/0279899 | A1 | 9/2016 | Cantwell et al. | |

OTHER PUBLICATIONS

International Preliminary Report on Patentability and the Written Opinion of the International Searching Authority as issued in International Patent Application No. PCT/FR2020/051462, dated Feb. 17, 2022.

\* cited by examiner

[Fig. 1]
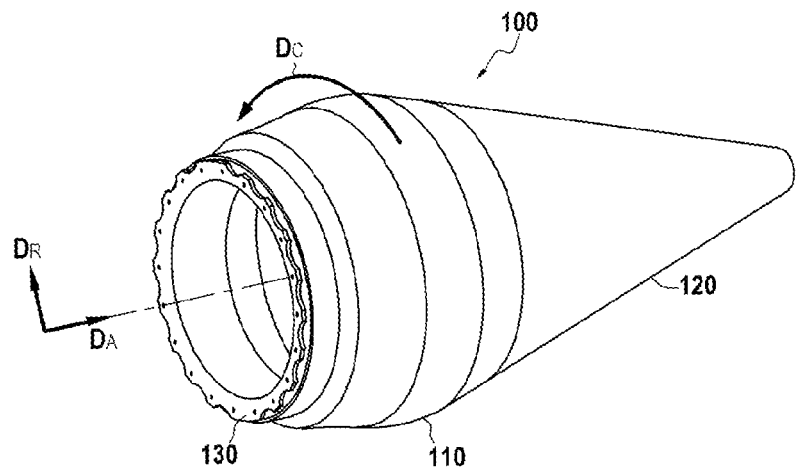
[Fig. 2]
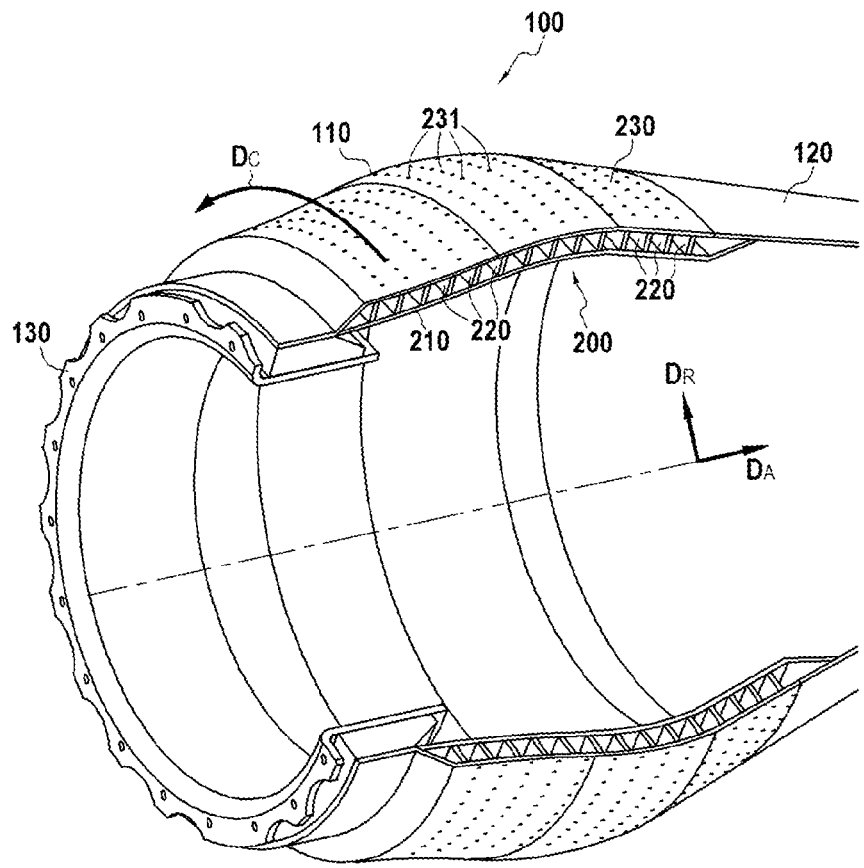

[Fig. 3A]
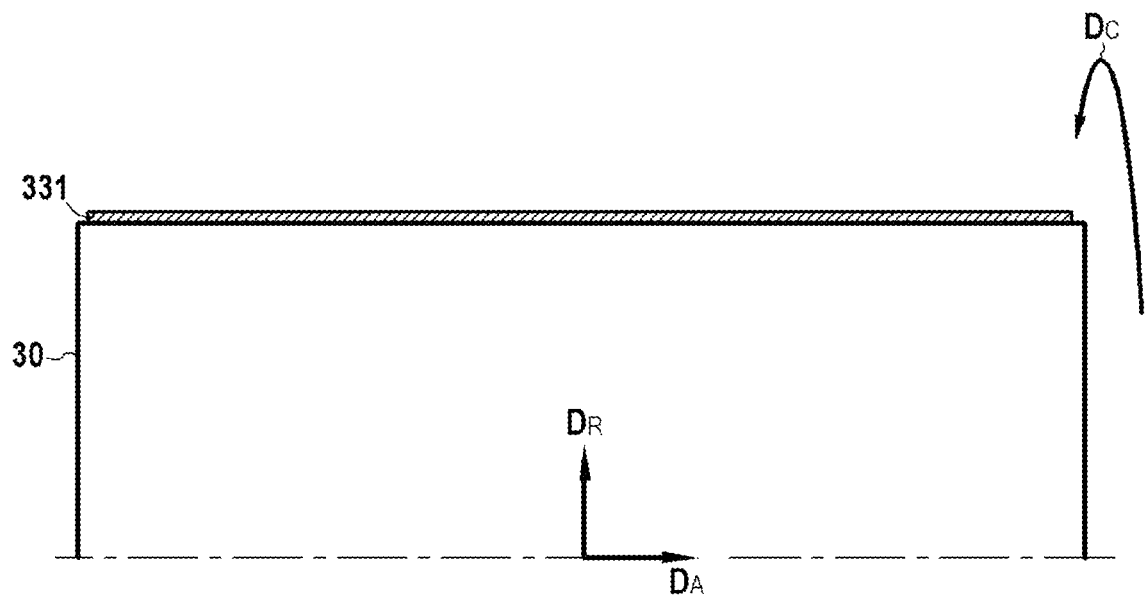
[Fig. 3B]
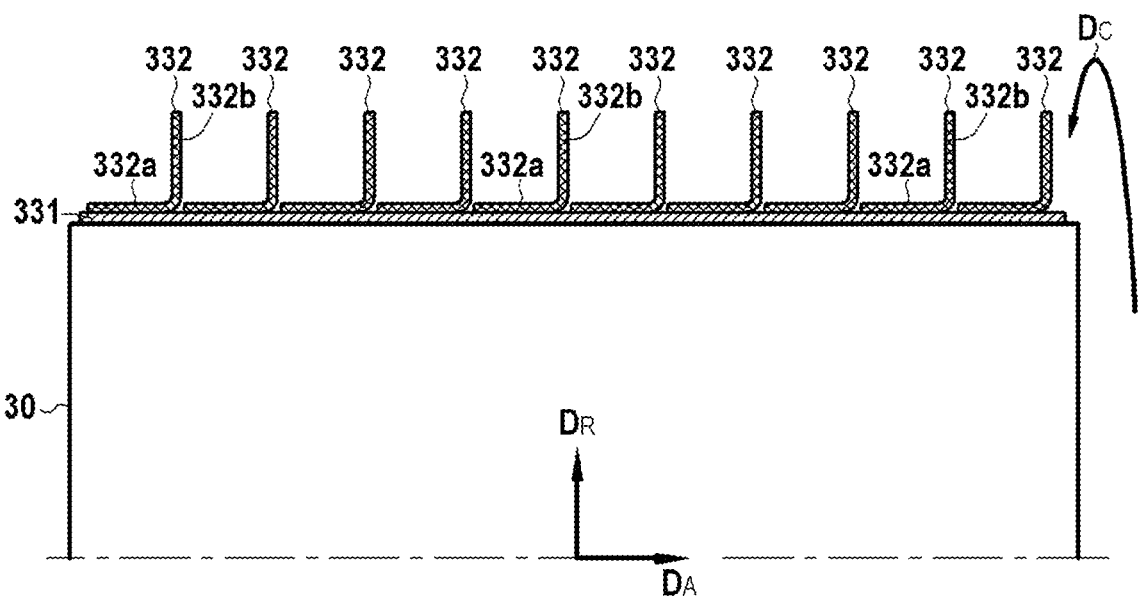

[Fig. 3C]
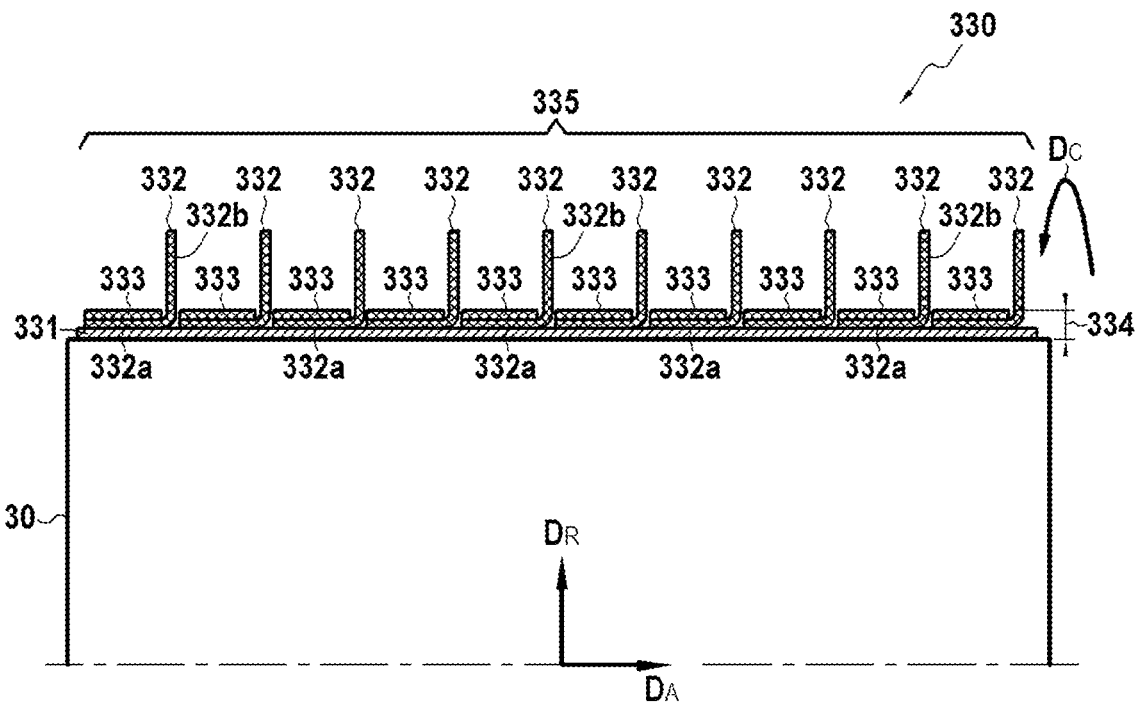
[Fig. 3D]
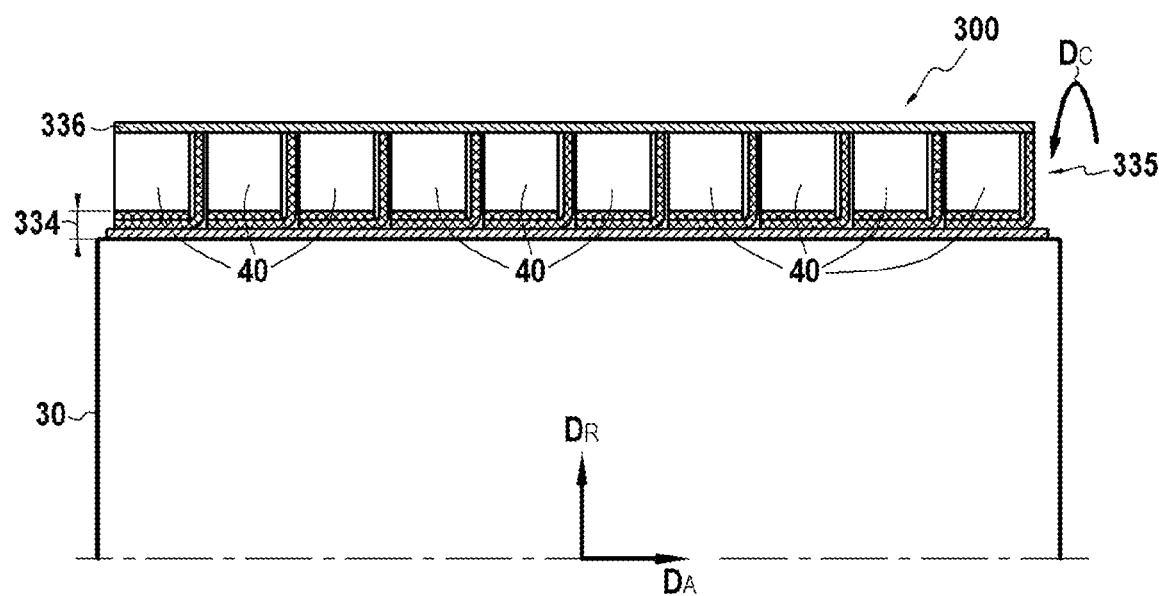

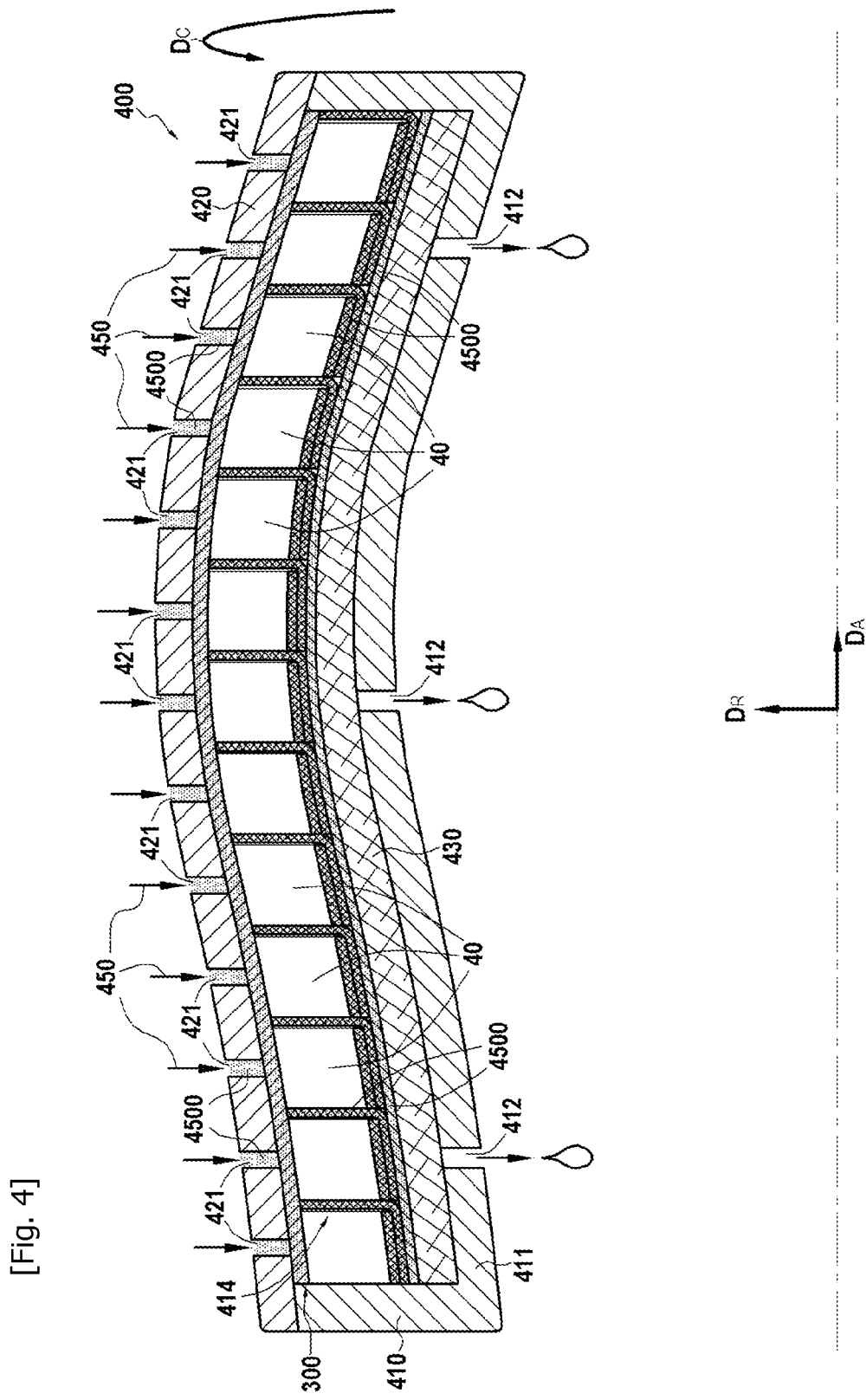
[Fig. 4]

[Fig. 5]
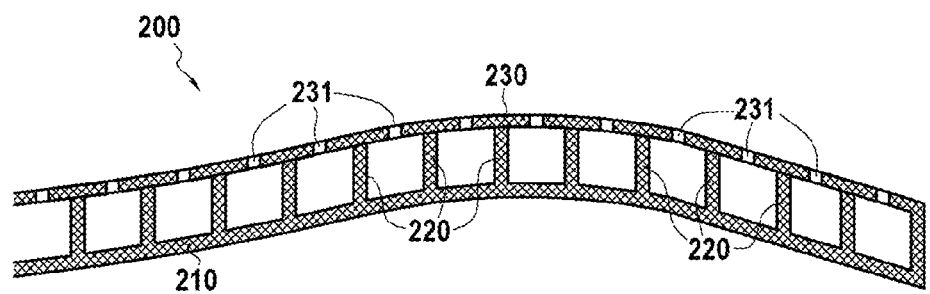

ACOUSTIC ATTENUATION STRUCTURE MADE OF COMPOSITE MATERIAL AND METHOD FOR MANUFACTURING SAME

CROSS-REFERENCE TO RELATED APPLICATIONS

This application is the U.S. National Stage of PCT/FR2020/051462, filed Aug. 12, 2020, which in turn claims priority to French patent application number 1909337 filed Aug. 22, 2019. The content of these applications are incorporated herein by reference in their entireties.

TECHNICAL FIELD

The present invention relates to the general field of acoustic attenuation structures. More particularly, it relates to acoustic attenuation structures or panels used to reduce the noise produced by airplane engines such as gas turbines or exhausts thereof.

PRIOR ART

In order to reduce the noise in the exhaust ducts of gas turbines, it is known to provide the surfaces of elements defining these ducts with acoustic attenuation structures. These structures typically consist of a first multi-perforated skin that is permeable to the acoustic waves which it is desired to attenuate and a second, solid reflecting skin, a core, such as a honeycomb or porous structure, being disposed between these two skins. In well-known manner, the cores of such structures form Helmholtz resonators which, in a certain frequency range, attenuate the acoustic waves produced in the duct.

In technical fields where weight increase is a constant concern, such as aeronautics, acoustic attenuation structures are preferably produced from composite material (fibrous reinforcement densified by a matrix) rather than from metal material.

Document U.S. 9 631 519 describes an acoustic attenuation structure for which the skins and the core are formed from composite materials allowing a mass saving with respect to the metal materials usually used. In that document, vertical acoustic partitions forming the cellular body are bonded to the inner and outer skins. The acoustic attenuation structure thus formed is intended to be used, in particular, in an aero-engine exhaust system. The acoustic attenuation structure can be, for example, incorporated into the structure of the jet nozzle and/or cone of the rear body of the engine.

In this case, the thermomechanical strength of the acoustic attenuation structure can be problematic with regard to the significant temperature gradients encountered during the transitory phases of engine operation. More specifically, during engine start-up and shutdown phases the structure can be subjected to temperature gradients between its inner skin and its outer skin of between 100° C. and 300° C., leading to significant differential expansion between the two skins. The acoustic partitions are then stressed by significant mechanical forces which can lead to the total separation of the partitions from the skins.

Consequently, there is a need to reinforce the connection between the acoustic partitions and the skins in an acoustic attenuation structure made of composite material.

DISCLOSURE OF THE INVENTION

For this purpose, the present invention proposes an annular or semi-annular acoustic attenuation structure comprising an inner skin and an outer skin, defining between them an annular or semi-annular volume, and a plurality of partitions extending in the space in a radial direction perpendicular to the inner and outer skins and in a circumferential direction, the inner and outer skins and the partitions being made of composite material comprising a fibrous reinforcement densified by a matrix, characterized in that the fibrous reinforcement of each partition comprises fibers extending into the fibrous reinforcement of at least one of the inner or outer skins.

By thus extending the fibrous reinforcement of at least one of the inner or outer skins to the fibrous reinforcement of the partitions, the connection of the partitions with at least one of the skins is significantly reinforced by generating a continuity of the fibrous reinforcement. The risk of separation of the acoustic partitions from at least one of the skins is greatly reduced, which makes it possible to preserve the mechanical integrity of the acoustic attenuation structure and, consequently, its lifespan According to a particular feature of the structure of the invention, the outer skin includes a plurality of perforations. An object of the invention in this case is, in particular, an aero-engine jet cone comprising such an acoustic attenuation structure.

According to a particular feature of the structure of the invention, the inner skin includes a plurality of perforations. An object of the invention in this case is, in particular, an aero-engine jet nozzle comprising such an acoustic attenuation structure.

The invention also relates to a gas-turbine aero-engine comprising a jet cone or a jet nozzle according to the invention.

The invention further relates to an aircraft comprising at least one engine according to the invention.

Another object of the invention is a method for producing an acoustic attenuation structure made of composite material according to the invention, comprising the following steps:
producing an acoustic attenuation structure fibrous preform comprising a first portion intended to form an inner skin, a second portion intended to form an outer skin and a third portion intended to form partitions, fibers present in the third preform portion extending at least into the first preform portion or the second preform portion,
placing the fibrous preform in a mold having the shape of an acoustic attenuation structure to be produced, the mold comprising at least an injection port, an outlet port and a filter interposed between the fibrous preform and said at least one outlet port,
densifying the fibrous preform by a matrix.

In the case of producing an acoustic structure made of ceramic matrix composite (CMC) material, the densification of the fibrous preform comprises the following steps:
injecting a liquid loaded with ceramic particles or particles of a ceramic precursor or a mixture of the two, into the fibrous preform,
draining, via the filter, the liquid having passed through the fibrous preform and retaining particles inside the preform by said filter so as to obtain a fibrous preform loaded with particles,
high-temperature sintering of the ceramic particles constituting the matrix, with or without the use of a ceramic precursor, which may be, non-exhaustively, a sol or an organosilicon polymer, or
infiltrating the fibrous preform with a silicon-based molten composition.

According to a particular feature of the method of the invention, the fibrous preform is at least partially produced by placing of fibers.

According to another particular feature of the method of the invention, the third portion of the fibrous texture comprises one or more laminations of two-dimensional or unidirectional fabric, each lamination extending at least partially into the first portion or the second portion of the fibrous texture.

BRIEF DESCRIPTION OF THE FIGURES

FIG. 1 is a perspective schematic view of a jet cone of an aero-engine exhaust system according to an embodiment of the invention.

FIG. 2 is a prospective schematic view showing an acoustic attenuation structure present in the upstream portion of the jet cone of FIG. 1.

FIG. 3A is a sectional schematic view showing the embodiment of a fibrous preform intended to form the fibrous reinforcement of the acoustic attenuation structure of FIG. 2.

FIG. 3B is a sectional schematic view showing the embodiment of a fibrous preform intended to form the fibrous reinforcement of the acoustic attenuation structure of FIG. 2.

FIG. 3C is a sectional schematic view showing the embodiment of a fibrous preform intended to form the fibrous reinforcement of the acoustic attenuation structure of FIG. 2.

FIG. 3D is a sectional schematic view showing the embodiment of a fibrous preform intended to form the fibrous reinforcement of the acoustic attenuation structure of FIG. 2.

FIG. 4 is a sectional schematic view showing the injection of a slurry into the fibrous preform of FIG. 3D, FIG. 5 is a partial sectional view of the radial acoustic attenuation structure of the combustion system of FIG. 1 obtained after formation of a ceramic matrix in the fibrous preform of FIG. 4.

DESCRIPTION OF THE EMBODIMENTS

A particular but non-exclusive area of application of the invention is that of gas-turbine aero-engine exhaust systems such as those used in airplanes or helicopters. These exhaust systems comprise, in particular, a jet nozzle and a jet cone defining, between them, a jet channel for the exhaust gases.

FIGS. 1 and 2 represent a jet cone 100 of a gas-turbine engine exhaust system according to an embodiment of the invention. The jet cone 100 has a shape rotationally symmetric about an axial direction $D_A$ and comprises an upstream portion 110 incorporating an acoustic attenuation structure 200 and a downstream portion 120 completing the aerodynamic line. Here, the jet cone is made of CMC is material. The end of the upstream portion 110 of the cone has a metal attachment flange 130 forming part of the engine casing (not shown in FIGS. 1 and 2) or intended to be attached thereon.

In well-known manner, parts made of CMC material are formed by a fibrous reinforcement made of refractory fibers (carbon or ceramic) which is densified by a ceramic matrix, in particular carbide, nitride refractive oxide, etc. Typical examples of CMC materials are oxide/oxide materials (oxide fiber and oxide matrix such as, for example, alumina, mullite or alumino-silicate matrix), C-SiC (reinforced with carbon fibers and silicon carbide matrix), SiC-SiC materials and C-C/SiC materials (mixed carbon/silicon carbide matrix). The manufacture of parts made of CMC composite is well known.

The upstream portion 110 of the jet cone 100 comprises an acoustic attenuation structure 200 which consists, in the example described here, of an inner structural skin 210, circumferential acoustic partitions 220 and an outer acoustic skin 230. The outer skin 230 delimits the inner surface of the flow path of the exhaust gases. The outer skin 230 also has perforations 231 in order to allow the entry of acoustic waves to be attenuated in the attenuation structure, while the inner skin 210 is solid so as to reflect these waves. The acoustic partitions 220 extend in a radial direction $D_R$ between the inner and outer skins 210 and 230 and in a circumferential direction $D_C$. The acoustic partitions 220 are spaced apart from one another in the axial direction $D_A$. Between them, the partitions 220 form chambers 221 capable of damping the sound waves that it is desired to attenuate.

A method for manufacturing the acoustic attenuation structure 200 according to an embodiment of the invention is now described.

The manufacture of the acoustic attenuation structure starts with the production of a fibrous preform of the structure. According to the invention, the preform portions corresponding to the acoustic partitions contain yarns or fibers which extend at least into the portions intended to form the inner skin or the outer skin.

In the example described here, the production of the fibrous preform of the attenuation structure is carried out using the automated fiber placing (AFP) method. The AFP method consists in juxtaposing a plurality of fiber ribbons using a depositing head. Each ribbon is applied and cut independently of the others, which enables the depositing head to follow shapes with pronounced curvature and to stop the material as close as possible to the contours of the finished part. The fibers used to constitute the ribbons to be deposited can, in particular, be oxide fibers (alumina, alumina/mullite, quartz, etc.) carbon or silicon carbide fibers, or even a mixture of carbon and silicon carbide fibers.

In FIG. 3A, the production of the preform starts with the formation of the preform portion intended to form the inner skin 210 and the acoustic partitions 220 of the acoustic attenuation structure 200. For this purpose, a first fibrous layer 331 is formed by depositing fiber ribbons on a mandrel 30 according to the AFP method, the thickness of the layer 331 being adjusted by the number of superimposed fiber ribbons. Then, as illustrated in FIG. 3B, a plurality of fibrous layers 332 is formed on the layer 331 according to the AFP method, the thickness of each layer 332 being adjusted by the number of superimposed fiber ribbons Each layer 332 has a first portion 332a in contact with the fibrous layer 331 and a second portion 332b extending above the layer 331 in the radial direction $D_R$ and in the circumferential direction $D_C$ substantially perpendicular to the surface of the layer 331. The portion 332b of each layer 332 is intended to form all or part of an acoustic partition of the acoustic attenuation structure. The portions 332b can be held by means of a specific tooling (not shown in FIG. 3B).

As illustrated in FIG. 3C, a plurality of fibrous layers 333 is formed on the portion 332a of each fibrous layer 332 according to the AFP method, the thickness of each layer 333 being adjusted by the number of superimposed fiber ribbons A single-piece fibrous preform 330 is thus obtained which comprises a first portion 334 bringing together the fibrous layer 331, the portions 332a of the fibrous layers 332 and the fibrous layers 333, this first portion 334 being intended to form the inner skin 210 of the acoustic attenuation structure 200. The fibrous preform 330 also comprises a second portion 335 consisting of the portions 332b of the fibrous layers 332, this second portion being intended to form the acoustic partitions 220 of the acoustic attenuation structure 200.

In FIG. 3D, a fibrous layer 336 is formed on the second portion 335 of the fibrous preform 330, again by depositing fiber ribbons according to the AFP method. The thickness of the layer 336 is adjusted by the number of superimposed fiber ribbons. Angular conformation sectors 40, are placed between the portions 332b of the fibrous layers 332 so as to maintain the shape of the second portion and avoid collapsing of the fibrous layer 336. An adhesive, for example a ceramic adhesive, can be interposed between the free ends of the portions 332b of the layers 332 and the layer 336 in order to reinforce the connection between these layers. A fibrous preform 300 of the acoustic attenuation structure to be produced is then obtained.

Once the fibrous preform 300 is produced, it is placed in an injection tooling which enables, as explained below, impregnating of the preform with a slurry according to the Slurry Transfer Molding (STM) method.

More precisely and as illustrated in FIG. 4, the fibrous preform 300 and the angular confirmation sectors 40 are placed in a tooling 400. The tooling 400 comprises a mold 410 and a counter-mold 420. The mold 410 comprises a bottom 411 provided with a plurality of vents 412. The mold 410 and the counter-mold 420 together define a molding cavity 414 the geometry of which corresponds to that of the acoustic attenuation structure to be produced. The mold 410 and the counter mold 420 serve to define the geometry and dimensions of the preform and therefore of the part to be obtained.

The counter-mold 420 has a plurality of injection ports 421 through which a liquid loaded with particles is intended to be injected in order to penetrate into the pore space of the fibrous preform 300.

A part made of porous material 430 is present in the molding cavity 414 between the vents 12 of the mold 410 and the fibrous preform 300. The part made of porous material 430 can be produced, for example, from polytetrafluoroethylene (PTFE). The part made of porous material 430 enables the liquid to drain out of the fibrous preform and to be evacuated via the outlet vents 412 due to the application of a pressure gradient between the outlet vents 412 and the injection ports 421 while retaining the particles in the fibrous preform. By way of example, the part made of porous material 430 can have a thickness greater than or equal to 1 mm, or even of several millimeters. The average porosity of the part made of porous material 430 can be approximately 30%. The average size of the pores (D50) of the part made of porous material can be, for example, between 1 µm and 2 µm. The part made of is porous material corresponds to or is capable of conforming to the shape of the molding cavity 414.

In the example described here, the loaded liquid corresponds to a slurry containing a powder of alumina particles. FIG. 4 illustrates the configuration obtained during the injection of a slurry 450 and the drainage of the liquid medium therefrom. The slurry 450 was injected under pressure via the injection ports 421 so as to penetrate into the fibrous preform 300. The refractory ceramic particles 4500 present in the slurry 450 are intended to enable the formation of an oxide matrix in the pore space of the fibrous preform 300. The slurry can be a suspension containing particles having a mean particle size between 0.1 µm and 10 µm. The content by volume of particles in the slurry, before injection, can be between 20% and 40%. The liquid medium of the slurry can contain, for example, an aqueous phase having an acid pH (i.e. a pH less than 7) and/or an alcohol phase comprising, for example, ethanol. The slurry can contain an acidity regulator such as nitric acid and the pH of the liquid medium can, for example, be between 1.5 and 4. The slurry can further contain an organic binder such as polyvinyl alcohol (PVA) which is particularly soluble in water. It can also incorporate a liquid or dissolved precursor of the oxide ceramic such as an alumina sol, a mullite sol, an aluminosilicate sol, a silica sol, a polysiloxane or any other organosilicon polymer.

As illustrated in FIG. 4, the refractory ceramic particles 4500 are present after injection of the slurry 450 into the pore space of the fibrous preform 300 while the liquid phase of the slurry is drained via the part made of porous material 430 and evacuated via the vents 412.

Additionally, pumping can be performed at the outlet vents 412 during the drainage, for example by means of a roughing vacuum pump. The performance of such pumping improves the drainage and quicker drying of the fibrous texture.

In this configuration, the part made of porous material 430 can retain, in the fibrous preform 300, the refractory ceramic particles 4500 initially present in the slurry and all or part of these particles are deposited by filtration in the fibrous preform.

Once the injection and drainage steps have been carried out, a fibrous preform is obtained loaded with particles, for example alumina particles. The obtained preformed is then dried and demolded, the preform being able to keep, after demolding, the shape adopted in the molding cavity.

The following step consists in carrying out a high-temperature thermal treatment for performing the sintering of the oxide grains and optionally transforming the ceramic precursor into ceramic.

An acoustic attenuation structure 200 (FIG. 5) made of CMC composite material is then obtained, namely comprising a fibrous reinforcement densified by an oxide matrix. According to the invention, the fibrous reinforcement of each acoustic partition 220 contains fibers which extend into the fibrous reinforcement of the inner skin 210.

The acoustic attenuation structure being intended to be incorporated in a jet cone, perforations 231 are produced in the outer skin 230. The perforations can be produced, in particular, on the final part by drilling, with a bit or laser, the outer skin 230.

In the example just described, the fibers of the fibrous reinforcement of the acoustic partitions extend into the fibrous reinforcement of the inner skin. According to an embodiment of the invention, the fibers of the fibrous reinforcement of the acoustic partitions extend into the fibrous reinforcement of the outer skin. According to another variant, the fibers of the fibrous reinforcement of the acoustic partitions extended both into the fibrous reinforcement of the inner skin and into the fibrous reinforcement of the outer skin.

In the case of an acoustic attenuation structure made of CMC, the matrix of which is at least partially made of SiC, the oxide particles or grains are replaced by particles or grains of SiC and the step of sintering the particles is replaced by a step consisting of infiltrating the preform with a composition based on molten silicon (silicidation) so as to form a ceramic matrix; a densification process known as melt infiltration (MI).

Furthermore, in the previously described exemplary embodiment, the fibrous reinforcement of the acoustic attenuation structure has been produced using the automated fiber placing method, AFP. However, the fibrous reinforcement, in particular of the acoustic partitions, can also be produced by unidirectional (UD) or two-dimensional (2D) draping of fabric laminations. The UD or 2D laminations used to form the fibrous reinforcement of the acoustic partitions extending into the fibrous reinforcement of the inner skin or of the outer skin, or again into the fibrous reinforcements of the inner and outer skins, can be produced by the AFP method or by draping UD or 2D laminations.

In the previously described examples, a so-called "dry" fibrous preform is used, in other words the preform is produced from non-impregnated fibers, yarns or fibrous laminations, the impregnation being carried out after the forming of the preform. According to another embodiment, the fibrous preform of the acoustic attenuation structure is produced by draping 2D or UD laminations which are preimpregnated with a composition comprising ceramic particles and a ceramic liquid precursor such as, for example a sol or an organosilicon polymer, the preform thus formed then being thermally treated in order to transform the precursor into ceramic. In this case, the above-described steps of injection into and drainage from the preform are no longer necessary.

The 2D or UD laminations can also be preimpregnated with an organic matrix precursor, such as an epoxy resin for example. In this case, an acoustic attenuation structure is obtained made of organic matrix composite (OMC) material.

The acoustic attenuation structure according to the invention can correspond to a rotationally symmetric part and be produced as a single piece or from a plurality of annular sectors assembled together.

The acoustic attenuation structure of the invention can be, in particular, incorporated in an aero-engine jet cone as described above and/or again in a jet nozzle of an aero-engine exhaust system.

The invention claimed is:

1. Annular or semi-annular acoustic attenuation structure comprising an inner skin and an outer skin, defining between them an annular or semi-annular volume, and a plurality of partitions extending in a space in a radial direction perpendicular to the inner and outer skins and in a circumferential direction of the annular or semi-annular acoustic attenuation structure to define a plurality of adjacent chambers that extends along the circumferential direction, the inner and outer skins and the plurality of partitions being made of composite material comprising a fibrous reinforcement densified by a matrix, the fibrous reinforcement of the inner skin or the outer skin includes at least one fibrous layer extending over a length of the annular or semi-annular acoustic attenuation structure, wherein the fibrous reinforcement of each partition is formed with a first portion of one or several fibrous layers extending in the radial direction and in the circumferential direction, a second and remaining portion of said one or several fibrous layers of each partition extending in an axial direction from said first portion to substantially a first portion of another one or several fibrous layers of another partition that is adjacent said partition, wherein three adjacent partitions of the plurality of partitions extending in the radial direction and that define two adjacent chambers of the plurality of adjacent chambers are formed with, respectively, the first portions of three different ones of the one or several fibrous layers such that each partition of the three adjacent partitions is separately formed, wherein, for each partition, the second and remaining portion of said one or several fibrous layers extending in the axial direction is layered on said at least one fibrous layer of the fibrous reinforcement of only one of the inner skin and the outer skin,
wherein the second and remaining portions of two adjacent partitions of the plurality of partitions extend in said axial direction without being woven to each other,
wherein the first portions of said three different one or several fibrous layers extend in the radial direction without being woven to each other.

2. The annular or semi-annular acoustic attenuation structure according to claim 1, wherein the outer skin includes a plurality of perforations.

3. Jet cone of an aero-engine comprising an annular or semi-annular acoustic attenuation structure according to claim 2.

4. Gas-turbine aero-engine comprising a jet cone according to claim 3.

5. Aircraft comprising at least one gas-turbine aero-engine according to claim 4.

6. The annular or semi-annular acoustic attenuation structure according to claim 1, wherein the inner skin includes a plurality of perforations.

7. Jet nozzle of an aero-engine comprising an annular or semi-annular acoustic attenuation structure according to claim 6.

8. Gas-turbine aero-engine comprising a jet nozzle according to claim 7.

9. Aircraft comprising at least one gas-turbine aero-engine according to claim 8.

10. Method for producing an annular or semi-annular acoustic attenuation structure made of composite material, according to claim 1, comprising:
producing an acoustic attenuation structure fibrous preform comprising a first part intended to form the inner skin, a second part intended to form the outer skin and a third part intended to form the partitions, and
densifying the fibrous preform by the matrix,
wherein the first part or the second part of the acoustic attenuation structure fibrous preform includes the at least one fibrous layer extending over the length of the acoustic attenuation structure and wherein the third part of the acoustic attenuation structure fibrous preform is formed with the first portion of said one or several fibrous layers extending in the radial direction, the second portion of said one or several fibrous layers extending in the axial direction layered on said first part or second part of the acoustic attenuation structure.

11. The method according to claim 10, wherein the acoustic attenuation structure fibrous preform is at least partially produced by placing of fibers.

12. The method according to claim 10, wherein the third part of the acoustic attenuation structure fibrous preform comprises one or more laminations of unidirectional or two-dimensional fabric, each lamination extending at least partially into the first part or the second part of the acoustic attenuation structure fibrous preform.

* * * * *